US009738102B2

(12) United States Patent
Ganapathiappan et al.

(10) Patent No.: US 9,738,102 B2
(45) Date of Patent: Aug. 22, 2017

(54) INK-JET INK PRINTING SYSTEM AND METHOD

(75) Inventors: Sivapackia Ganapathiappan, Los Altos, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1134 days.

(21) Appl. No.: 13/383,691

(22) PCT Filed: Sep. 3, 2009

(86) PCT No.: PCT/US2009/055904
§ 371 (c)(1),
(2), (4) Date: Jan. 12, 2012

(87) PCT Pub. No.: WO2011/028201
PCT Pub. Date: Mar. 10, 2011

(65) Prior Publication Data
US 2012/0147108 A1  Jun. 14, 2012

(51) Int. Cl.
| | | |
|---|---|---|
| *B41J 2/21* | (2006.01) | |
| *B41M 7/00* | (2006.01) | |
| *B41M 5/00* | (2006.01) | |
| *C09D 11/033* | (2014.01) | |
| *C09D 11/322* | (2014.01) | |
| *B41J 11/00* | (2006.01) | |

(52) U.S. Cl.
CPC ............ *B41M 7/009* (2013.01); *B41J 2/2107* (2013.01); *B41M 5/0047* (2013.01); *B41M 5/0064* (2013.01); *B41M 7/0027* (2013.01); *C09D 11/033* (2013.01); *C09D 11/322* (2013.01); *B41J 11/002* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC .. 347/100, 102, 95, 96, 101, 20, 21, 88, 99; 106/31.6, 31.27, 31.13; 523/160, 161
See application file for complete search history.

(56) References Cited

U.S. PATENT DOCUMENTS

| | | | |
|---|---|---|---|
| 4,644,030 A | | 2/1987 | Loewrigkeit et al. |
| 5,569,705 A | | 10/1996 | Vogt-Birnbrich et al. |
| 5,837,045 A | | 11/1998 | Johnson et al. |
| 6,020,399 A | | 2/2000 | Matzinger |
| 6,034,154 A | * | 3/2000 | Kase et al. ..................... 523/161 |
| 6,180,691 B1 | | 1/2001 | Cheng et al. |
| 6,262,207 B1 | | 7/2001 | Rao et al. |
| 6,479,586 B2 | * | 11/2002 | Matzinger ..................... 525/123 |
| 6,794,425 B1 | | 9/2004 | Ellis et al. |
| 6,848,777 B2 | * | 2/2005 | Chen et al. .................... 347/100 |
| 6,932,466 B2 | * | 8/2005 | Payne et al. ................... 347/100 |
| 7,291,211 B2 | * | 11/2007 | Kaneko et al. ............ 106/31.27 |
| 7,368,487 B2 | | 5/2008 | Wu et al. |
| 7,414,082 B2 | * | 8/2008 | Hirasa et al. ................. 523/160 |
| 7,828,426 B2 | * | 11/2010 | Brust et al. ................... 347/100 |
| 2002/0019458 A1 | * | 2/2002 | Hirasa et al. ................. 523/160 |
| 2004/0131855 A1 | * | 7/2004 | Ganapathiappan .......... 428/407 |
| 2004/0239740 A1 | | 12/2004 | Aono et al. |
| 2005/0243121 A1 | | 11/2005 | Onishi |
| 2006/0203061 A1 | * | 9/2006 | Ichinose et al. ............. 347/100 |
| 2007/0259989 A1 | * | 11/2007 | Berge et al. .................. 523/160 |
| 2008/0063981 A1 | * | 3/2008 | Ohnishi ........................ 430/302 |
| 2008/0118657 A1 | | 5/2008 | Taverizatshy et al. |
| 2009/0169748 A1 | | 7/2009 | House et al. |

FOREIGN PATENT DOCUMENTS

| | | |
|---|---|---|
| CN | 101321835 | 12/2008 |
| JP | 2006096933 | 4/2006 |
| WO | 2007049782 | 5/2007 |

OTHER PUBLICATIONS

Extended European Search Report dated Mar. 12, 2014 for Application No./Patent No. 09849064.2-1704/2473572 PCT/US2009055904, Applicant Hewlett-Packard Development Company, L.P., Reference No. P201690EP.

* cited by examiner

*Primary Examiner* — Manish S Shah
(74) *Attorney, Agent, or Firm* — Thorpe, North & Western L.L.P.

(57) ABSTRACT

An ink-jet ink printing method and associated system can have a printer including an ink-jet ink. The ink includes an aqueous liquid vehicle, 1 wt % to 5 wt % pigment, 1 wt % to 5 wt % acrylic polymer particles, 0.3 wt % to 3 wt % urethane polymer particles, and is formulated to print on a vinyl medium. The system also includes a heating device. Upon applying heat to the ink-jet ink printed on the vinyl medium, the polymer particles in the printed ink fuse, and form a film encapsulating at least a portion of the pigment on the vinyl print medium.

16 Claims, No Drawings

INK-JET INK PRINTING SYSTEM AND METHOD

BACKGROUND

Polymers are often used to improve the durability of prints using a variety of printing techniques. One example is the dry toner used in the commercial printers. These include polymers that are insoluble in water and typically do not include surface groups for stabilization for printability. Usage of such polymers is therefore difficult in water-based ink-jet inks. To overcome this problem, latex polymers are sometimes used since such polymers show low viscosity with higher amount of solid contents. However, the final print durability is typically not as good compared to electrophotography-based (i.e. laser-based) print. In some cases, chemical fixers are used to improve waterfastness. However, such a system often does not show the desired improvement in terms of rub resistance. Therefore, new polymeric materials or additives are needed to achieve more durable print performance with water-based ink-jet printing applications, particularly on nonporous media.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It is to be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink-jet ink. Liquid vehicles are well known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent. This refers in particular to liquid vehicles that are predominantly water, that is, in which water is present in an amount greater than any other individual liquid component.

As used herein, "liquid vehicle component" refers to any solvent, surfactant, and/or any other liquid present in a liquid vehicle.

As used herein, "colorant" can include dyes, pigments, and/or other particulates that may be suspended or dissolved in a liquid vehicle prepared in accordance with embodiments of the present disclosure. Dyes are typically water soluble, and therefore, can be desirable for use in some embodiments. However, pigments can also be used in other embodiments. Pigments that can be used include self-dispersed pigments and standard pigments that are dispersed by a separate dispersing agent, e.g., polymer dispersed. Self-dispersed pigments include those that have been chemically surface modified with a small molecule, a polymeric grouping, or a charge. This chemical modification aids the pigment in becoming and/or substantially remaining dispersed in a liquid vehicle. The pigment can also be dispersed by a separate additive, e.g. a polymer, an oligomer, or a surfactant, in the liquid vehicle and/or in the pigment that utilizes a physical coating to aid the pigment in becoming and/or substantially remaining dispersed in a liquid vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "dye" refers to the individual compound, complex, or molecule responsible for an ink's color, and is typically water soluble.

As used herein, $T_g$ is the glass transition temperature as calculated by the Fox equation: copolymer $T_g=1/(Wa/(T_gA)+Wb(T_gB)+ \ldots )$ where Wa=weight fraction of monomer A in the copolymer and $T_gA$ is the homopolymer $T_g$ value of monomer A, Wb=weight fraction of monomer B and $T_gB$ is the homopolymer $T_g$ value of monomer B, etc.

As used herein, the terms "rubfastness" and "smearfastness" each refer to the resistance of a printed ink image to removal by rubbing with a solid object. One type of smear fastness of interest in the ink-jet printing art is resistance to rubbing with the tip of a highlighter. Another type of disruption due to rubbing can include actual removal of the printed ink from the media surface. For example, dry rubbing and/or rubbing using ammonia cleaning solvent (Windex®) for ink printed on vinyl media is another example of determining rubfastness. Poor rubfastness results from insufficient adherence of the ink to the media surface or absorbance of the ink into the surface; as well as insufficient shear resistance within the primed ink.

As used herein, the term "waterfastness" refers to the resistance of a printed ink image to dilution or removal by exposure to water. Waterfastness can be measured by wetting printed ink with water or an aqueous solution and determining any change in optical density of the printed ink.

When evaluating "rubfastness" or "waterfastness" of an image printed in accordance with the system and/or method of the present disclosure, "increased" or "improved" rubfastness can be determined by comparing the printed image with a comparative printed image. The comparative printed image can be prepared identically to the printed image except that the polymer particles used to generate the comparative printed image do not comprise the mixture of acrylic and urethane described herein. In a more particular example, acrylic particles having the same monomer content in both inks, with the difference being that the comparative ink does not include urethane polymers. No other changes to the printing and fusing conditions are carried out.

The term "non-porous" when referring media refers to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 mm by 15 mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed thereto rotating at constant speed, the test solution applicator is brought into contact with the rotating test specimen and held in place under defined pressure. The test fluid is transferred from the test solution applicator onto the test specimen in a band whose width (controlled by the applicator slot width) is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry. It is noted that the printed images prepared using the systems and methods of the present disclosure are effective for both porous vinyl media and non-porous vinyl media, though it has typically been more difficult to print aqueous inks with acceptable rubfastness on non-porous vinyl media. This is a problem that is solved in particular in accordance with embodiments of the present disclosure.

As used herein, the term "urethane linkage" refers to any compound having the following structure:

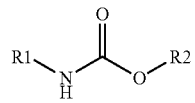

where R1 and R2 can represent any organic compound. Thus, a "urethane" or "polyurethane" includes polymers that have urethane linkages, including polymers not formed by traditional isocyanate and alcohols. When describing monomers, "urethane" indicates that the monomer has a urethane linkage.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Methods and systems for ink-jet ink printing on non-porous substrates, such as vinyl media, are described herein. In particular the present embodiments utilize an ink-jet ink comprising polymer particles that are configured to provide a durable print film on a vinyl medium, where the particles are also configured to be part of a stable ink-jettable ink composition. In an embodiment, the polymer particles can comprise a mixture of acrylic latex particles and urethane latex particles. The combination of particles can provide printing with increased durability when compared to inks including only acrylic latex.

Also, the mixture of acrylic and urethane polymer particles can be formulated to fuse upon reaching an appropriate temperature after being printed and thereby create a film that encapsulates the printed image. The film produced can be durable enough to protect the printed image from damage due to physical and chemical rubbing. The film can also provide added waterfastness to the image. The durability and waterfastness improvements resulting from the present embodiments can include greatly improved highlighter smearfastness, rub resistance, wet smudge resistance and optical density (after highlighting smear). Incorporation of such a mixture of latex polymers to the ink-jettable ink dispersions can help to increase the tensile strength of the film formed on a media and hence the enhanced print durability.

Acrylic latexes are amenable to inclusion in compositions that can be reliably jetted from ink-jet printing architecture. However acrylic polymers alone can exhibit poor durability, and particularly poor rubfastness and smearfastness using a dry rub test and an ammonia cleaning solvent (e.g. WIN-DEX®) when printed on vinyl media. One approach to enhancing durability is to increase the amount of polymer in the ink. For example, conventional pigment-based inks often include acrylic polymer particles in amounts around twice that of the pigment present. However, jettability of an ink decreases significantly as the amount of solid particulates dispersed therein increases. This is even more of a concern when attempting to formulate an ink that provides good color intensity when printed. Such a formulation can call for a pigment content of up to about 5 wt %. Adding enough acrylic polymer to such an ink so as to confer acceptable durability can result in an ink having a high enough solid content that jetting performance is impaired.

In inks according to the present embodiments, print durability is enhanced by including a mixture of acrylic polymer particles and urethane polymer particles. More particularly, this approach can involve substituting urethane polymer for a portion of the acrylic polymer one would normally include in a high-durability ink formulation. Because urethane polymers are generally more durable than acrylic polymers, the same durability can be obtained from a smaller amount of urethane polymer as compared to acrylic polymer. One aspect of the present embodiment is that an ink comprising a mixture of acrylic and urethane can provide better durability per unit of solid content than inks with only acrylic polymers. In another aspect, an ink comprising an acrylic and urethane mixture can include a lower particulate content than a given acrylic-based ink, while exhibiting a similar or greater level of durability than acrylic-based ink.

In a particular embodiment, an ink-jet ink composition can comprise an aqueous liquid vehicle, a colorant, and a set of polymer particles including acrylic latex particles and urethane particles dispersed within the ink. In one aspect, the acrylic polymer content of the ink and the urethane polymer content are present in substantially distinct particles. That is, a portion of the particles dispersed in the ink consist essentially of urethane polymer and these particles are distinct from other particles in the ink that consist essentially of acrylic polymer. In such an embodiment, the relative content of acrylic and urethane in the ink is reflected in the relative numbers of each kind of particle present. In an alternative embodiment, the ink may include acrylic-urethane hybrid polymers, where the ratio of acrylic to urethane can be configured by selecting the polymer ratios of individual particles.

The amounts of each polymer included in the ink can be selected to provide a desired level of durability (rubfastness, waterfastness, and/or smearfastness), while providing a stable dispersion of solids so that the resulting composition is reliably jettable. The total amount of the polymer particles in the ink can be in the range of from about 0.5 wt % to about 40 wt %, or more particularly from about 1 wt % to about 15 wt %, or still more particularly from about 3 wt % to about 6 wt %. According to one embodiment, the ink can be a pigment-based ink comprising pigment at from about 1 wt % to about 5 wt %, or from about 2 wt % to about 4 wt %. The acrylic polymer particles can be present at from about 1 wt % to about 5 wt %, and the urethane polymer particles can be present at from about 0.3 wt % to about 3 wt %.

In one particular embodiment, the percentage of acrylic polymer replaced with urethane can be from about 5 wt % to about 50 wt %, and the urethane replacing it can constitute from about 1% to about 30% of the total resulting polymer mixture. To illustrate the improvement of using both types of polymer (acrylic and urethane) over using a larger amount of just acrylic polymer, the durability and jettability of an ink containing pigment and acrylic polymer at weight percentage ratio of 1:2 can be exceeded in an ink containing pigment, acrylic polymer, and urethane polymer at a respective ratio of 1:1:0.5, for example. In another exemplary embodiment, an ink can feature a pigment to acrylic to urethane ratio of about 1:1:0.3 with improved results over an ink without urethane, but with more acrylic polymer. In still another exemplary embodiment, a pigment to acrylic to urethane ratio can be about 1:1.3:0.3 with improved results. These examples are presented for illustration, and should not be construed as limiting the number of ratios possible within the replacement range taught above. Stated more generally, the inks prepared in accordance with embodiments of the present disclosure can have a pigment to total polymer ratio of about 1:1 to about 1:2, where the total polymer content has an acrylic to urethane weight ratio of about 1:0.2 to about 1:1. In another embodiment, the acrylic polymer particles to urethane polymer particles weight ratio can be about 1.3:0.3 to about 1:0.5.

As discussed above, increasing polymer content can have the effect of increased durability but generally at the expense of degraded jettability. In the embodiments of the present disclosure, both of these properties can be improved by the replacement of some percentage of the acrylic polymer with a smaller amount of urethane polymer. It should be noted that the term "replacement" as used in this context does not refer to modifying an already formulated acrylic-based ink. Rather, it generally refers to a difference in the way two inks are formulated, where a first ink includes an amount of acrylic but no urethane, and a second ink includes less acrylic than the first and also includes an amount of urethane. In a particular embodiment, the amount of urethane can be less than the difference in the amount of acrylic present in the inks.

The acrylic polymer particles can be prepared by conventional emulsion polymerization techniques such as batch, semi-batch, or mini-emulsion processes. In a particular embodiment, the acrylic particles can comprise a polymerized hydrophobic monomer or a copolymer with a significant fraction of hydrophobic monomers. Hydrophobic monomer can be present in amounts of up to about 98%. Hydrophobic monomers provide durability to the resulting print film and therefore result in the printed ink having substantial rubfastness and waterfastness. Hydrophobic monomers that are suitable for use in the core or the shell include but are not limited to methyl acrylate, ethyl acrylate, propyl acrylate, butyl acrylate, hexyl acrylate, lauryl acrylate, octadecyl acrylate, methyl methacrylate, ethyl methacrylate, propyl methacrylate, butyl methacrylate, hexyl methacrylate, lauryl methacrylate, octadecyl methacrylate, 2-ethylhexyl acrylate, 2-ethylhexyl methacrylate, methylstyrene, vinylbenzyl chloride, acrylonitrile, methacrylonitrile, and styrene. The monomers used can be selected to provide desired results in view of printing conditions, the ink-jet system to be used, or the particular medium onto which printing is done. In a more particular embodiment, the acrylic polymer includes at least two of styrene, butyl acrylate, and methacrylonitrile.

A small amount of copolymerized acidic monomer, e.g., from 0.1 wt % to about 30 wt %, can optionally be included with the hydrophobic monomers to facilitate synthesis of the polymer. Suitable acidic monomers include acrylic acid, methacrylic acid, itaconic acid, maleic acid, vinyl benzoic acid, and styrenesulfonates or their derivatives: These monomers provide surface charge to the particles so as to stabilize them in water. The imparted charge can be further enhanced by raising the pH of the ink so that the carboxyl group is converted to the salt form.

In a particular embodiment, the acrylic polymer particles can also include cross-linking to provide shear strength to the particles before and during jetting. Cross-linking monomers can be present in the polymer up to about 25 wt %. Suitable cross-linking monomers include polyfunctional monomers and oligomers that contain an organic functional group available for cross-linking after polymerization. Cross-linking monomers that can be used include, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene, and combinations thereof, mixtures thereof, and derivatives thereof.

The urethane particles can comprise any combination of constituent monomers that can react to form polyurethanes. In a particular aspect, at least two constituent monomers are used, the first monomer being a molecule having at least two isocyanate moieties, such as a diisocyanate. Some examples of diisocyanates that may be used include isophorone diisocyanate, tolylene-2-4-diisocyanate, hexamethylene diisocyanate, napthalene diisocyanate, 2,4-toluene diisocyanate, 2,6-toluene diisocyanate, methylene diphenyl-4,4'-diisocyanate, 1,4-tetramethylene diisocyanate, and biphenyl diisocyanate. In the same aspect, the second monomer may be a polyol, e.g. a diol. Potential constituent diols include $C_2$-$C_8$ diols as well as polyglycols, including ethylene glycol, propylene glycol, polyethylene glycols, polypropylene glycols, bisphenol-A, hydroquinone, and polybutylene glycols. These can be reacted to produce urethane linkage groups or polyurethanes. Commercially available urethane latex polymers that are known to be suitable for use in paints, inks, and other colorant compositions can be used in the present embodiments.

The liquid vehicle can be chosen for suitability with a particular ink-jet printing system or for use with a particular print medium. As discussed above, the particles described herein provide a particular benefit for formulating aqueous ink-jet inks that produce good results on non-porous print media such as vinyl. As such, in a particular embodiment, the ink-jet ink vehicle is an aqueous vehicle.

The vehicle can consist essentially of water. Alternatively, additional co-solvents can be included in a vehicle that is predominantly water. More particularly, the vehicle can include organic co-solvents known in the art to be suited for formulating aqueous ink-jet inks. Suitable water soluble organic co-solvents, but are not limited to, aliphatic alcohols, aromatic alcohols, diols, triols, glycol ethers, poly (glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. In particular, the co-solvent included can have a vapor pressure such that it will evaporate under heating as least as quickly as the water in the vehicle. In a more particular embodiment, the co-solvent evaporates more quickly than the water upon application of heat.

The pigments suitable for use in the ink-jet ink are not particularly limited, and inorganic pigments or organic pigments may be used. Suitable inorganic pigments include, for example, titanium oxide, cobalt blue ($CoO$—$Al_2O_3$), chrome yellow ($PbCrO_4$), and iron oxide. Suitable organic pigments include, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, and the like.

In conjunction with these or other pigments, non-limiting examples of dispersants that can be used in the formulations of exemplary embodiments of the present disclosure include Solsperse 32000, Solsperse 39000, Solsperse 5000, Solsperse 22000, Disperbyk 163, Disperbyk 167, Disperbyk 168, Disperbyk 180, Disperbyk 190, Disperbyk 191, or the like.

The ink-jet ink compositions can optionally also include wetting agents. Non-limiting examples of such wetting agents can include siliconepolyether acrylate such as Tego Rad 2200 N, Tego Rad 2300, and Byk 358N. The inks can also include polyether modified poly-dimethyl-siloxane wetting agents such as Byk 333, Byk 307, and Silwet L-7604. If used, wetting agents can be present at from 0.01% to about 10% by weight of the ink-jet ink composition.

The ink jet ink can further include other additives as needed to provide storage stability and jettability, including biocides, humectants, buffers, viscosity modifiers, sequestering agents, and stabilizing agents.

This system and method can provide durable and waterfast printing on media on which it is typically difficult to achieve such results. In particular, the system and method can be used for printing on media that do not absorb liquid inks well. These include non-porous surfaces such as vinyl. Polymer particles in accordance with the embodiments described herein, when formulated in an ink-jet ink, have been found to provide unexpectedly good results on vinyl media. Therefore, in a particular embodiment, the system and method includes printing on vinyl media with inks formulated for printing on vinyl media.

By selection of the monomer mixtures in each of the polymers, the polymers can be constituted so as to have a $T_g$ that facilitates film formation under particular print and heating conditions. According to a particular embodiment, the $T_g$ of the latex particles can generally be in the range of from about −40° C. to about 125° C. More particularly, the $T_g$ can be from about 0° C. to about 75° C., or still more particularly from about 15° C. to about 45° C.

Print films formed from high $T_g$ polymers can provide enhanced durability to a printed image encapsulated therewith. Therefore, in another particular embodiment, polymers having a high $T_g$ can be utilized. Generally, a high $T_g$ polymer can be any polymer having a $T_g$ of at least 45° C. In one embodiment, the high $T_g$ polymer can have a $T_g$ from about 45° C. to about 125° C. or any sub-range therein. In another embodiment, the high $T_g$ polymer can have a $T_g$ from about 50° C. to about 80° C.

The polymers used provide a durable protective film over or throughout the printed ink. In accordance with a general embodiment, formation of print films with these inks can be facilitated by heating of the printed ink and/or the print media to a degree sufficient to cause particle coalescence. The $T_g$ can be selected so that slight or moderate heating can be employed to cause coalescence. More particularly, the polymer particles can be formulated to have a $T_g$ such, that the degree of heating needed to cause coalescence does not unduly disrupt the color provided by the ink or damage the print medium. For example, the core polymer can have a $T_g$ that is within 10° C. of the ambient temperature at which printing occurs. Heating sufficient to cause the printed image to flow can be employed to insure that the proper interaction of particles, colorant, and print surface occurs so as to promote formation of the print film. In a more particular embodiment, the printed ink can be heated to a temperature of about 50° C. to about 100° C.

One aspect of the present embodiment provides durable ink-jet ink printing on vinyl media. As discussed above, it can be difficult to obtain satisfactory ink-jet printing on such media, as they do not readily absorb the quantity of liquid ink vehicle usually present in such inks. The present system and method provides an encapsulated print image through coalescence of printed latexes, facilitated in part by removal of a portion of the liquid vehicle. Heating of the printed ink or print medium in accordance with the present embodiment can cause film formation by evaporating away at least a portion of the liquid vehicle, or at least a portion of one of the liquid components of the liquid vehicle. Without being bound to a particular theory, it is believed that the evaporation of the vehicle promotes coalescence by bringing the particles into a denser arrangement. Therefore, the heat applied in the system and method can be sufficient to evaporate at least a portion of the liquid vehicle from the printed ink.

Another factor that can contribute to printing on vinyl media relates to how the vinyl medium itself reacts to the application of heat. That is, application of sufficient heat can cause a vinyl print surface to plasticize and become tacky. This tackiness, in combination with the heat-induced flow of the printed ink and fusion of polymer cores, can facilitate formation of a conformal film on the surface. The film and colorant adheres to the tackified surface, further enhancing the durability of the printed image. Therefore, in a particular embodiment the heat applied is sufficient to cause the vinyl surface to plasticize (without melting or flowing), but at the same time, the heat is sufficient to cause the polymers in the printed ink to flow.

A heating device can be incorporated into a print system in order to heat the media at or near the time of printing. Alternatively, the heating device can be used to heat the ink during or after jetting onto the medium.

Also provided is an ink-jet ink printing system and method can comprise at least one ink-jet ink comprising a mixture of urethane and acrylic polymer particles as described herein and a vinyl print medium. The vinyl print medium can be typically any predominantly vinyl material used for durable display of printed images. Examples of such media include, but are not limited to Avery 1005, Avery 3000, Avery 3100, Avery MPI 1005 EZ, Avery MPI 4002, Ultraflex Normandy Pro, Ultraflex JetFlex Fla., Ultraflex Strip Mesh, Ultraflex BTOflex, Verseidag Front Lit Standard Easy P/N 7945, LG Bannux 1100, 3M ScotchCal, Mactac JT5829, MacTac JT5929p, Intelicoat SBL-7SIJ, Intelicoat GFBL5SIJ, 3M Controltac Plus IJ180C-10, 3M Scotch-Light, Dykson Jet 220, C2S Sterling Ultra Gloss and the like.

In accordance with the system and method, an ink-jet ink comprising a colorant, an aqueous liquid vehicle, and a mixture of urethane and acrylic polymer particles is formulated for printing on a vinyl print medium. The ink-jet ink can be loaded in an ink-jet ink printer and printed on a vinyl medium. The resulting printed image can then be heated with a heating device to a temperature that promotes ink film formation and plasticizing of the vinyl print medium, e.g. about 50° C. to about 100° C., but that is not high enough to cause the vinyl print medium to flow. As water or other solvent(s) evaporate from the printed ink, the particles coalesce to encapsulate the colorant in a clear film. The temperature at which coalescence occurs is typically determined by the $T_g$ of the polymer. In accordance with one embodiment, the system can include a heating device configured to heat the ink. In a more particular embodiment, the heat source can be configured to heat the ink after it is printed on the print medium. In still another embodiment, the heating device can be configured to heat the surface of the print medium itself. The heating device can heat the surface directly via radiative heat, or can utilize a conductive or transmittive approach such as heating a surface of the medium other than the surface to be printed but in thermal connection with the print surface.

Summarizing and reiterating to some extent, a method of ink-jet printing and an associated system are disclosed which provide a durable print film for increased waterfastness and rub resistance. The ink-jet ink used can include a combination of particles comprising acrylic polymer particles and urethane polymer particles. The polymer particles can be configured to create a print film upon being printed upon a print medium. The ink-jet ink can provide increased durability with lower particulate content than inks relying solely on acrylic polymer, and so also providing more reliable jetting from ink-jet print heads.

EXAMPLES

Example 1—Testing Print Performance of Acrylic and Acrylic-Urethane Inks on Vinyl Media Three aqueous ink-jet inks are formulated in which pigment and latex polymer particles are dispersed in water. Ink A is formulated with pigment at 3 wt % and acrylic polymer particles at 4.5 wt %. Ink B is formulated with pigment at 3 wt % and acrylic polymer particles at 6 wt %. Ink C is formulated to include pigment at 3 wt %, acrylic polymer particles at 3 wt %, and urethane polymer particles at 1.5 wt %. The inks are loaded into ink-jet pens and installed in a Hewlett-Packard ink-jet printer. The inks are each printed on a non-porous vinyl medium, while observing print performance of each ink. The pen performance of Ink B is observed to exhibit a reduction in ink drop ejection velocity and poorer print quality relative to the pens printing Ink A or Ink C.

Example 2—Testing Rubfastness of Acrylic and Acrylic-Urethane Inks on Vinyl Media Inks A, B, and C from Example 1 are loaded into ink-jet pens and installed in a Hewlett-Packard ink-jet printer. The inks are each printed twice on non-porous vinyl medium. Two rub tests (dry rub and solvent rub) are then performed on the printings with a linear abraser (TABER® Linear Abraser-Model 5750). The tests involve the arm of the linear abraser stroking the media sample in a linear motion back and forth at a controlled stroke speed and length, the head of the linear abraser following the contours of the media samples. A 250 gram weight is added to the shaft of the arm of the linear abraser to make the load constant.

Specifically for the dry rub test, a stroking head or "weaser" is attached to the end of the arm of the linear abraser. This stroking head has a contact patch with a diameter of approximately ¼ inch diameter and includes abrasive (specifically CALIBRASE® CS-10) with a mild to medium abrasive effect. The stroking head is stroked back and forth on each media sample.

In the solvent rub test, the stroking head is a conventional marker tip saturated with WINDEX® glass cleaner. The marker tip is stroked back and forth on each media sample.

The rubbed media samples are then judged for image loss. The samples printed with Ink C are observed to exhibit markedly higher dry rubfastness and solvent rubfastness than the samples printed with Ink A and Ink B.

Example 3—Testing Rubfastness of Additional Acrylic and Acrylic-Urethane Inks on Vinyl Media Two aqueous ink-jet inks, Ink D and Ink E, are formulated in which pigment and latex polymer particles are dispersed in water. Ink D is formulated with pigment at 3 wt % and acrylic polymer particles at 4.8 wt %. Ink E is formulated to include pigment at 3 wt %, acrylic polymer particles at 3.9 wt %, and urethane polymer particles at 0.9 wt %. The inks are loaded into ink-jet pens and installed in a Hewlett-Packard ink jet printer. The inks are printed on vinyl medium.

The rub tests of Example 2 are each performed on printings of ink D and Ink E. The rubbed media samples are then judged for image loss. The samples printed with Ink E are observed to exhibit markedly higher dry rubfastness and solvent rubfastness than the samples printed with Ink D.

While the forgoing exemplary embodiments are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the invention be limited, except as by the claims set forth below.

What is claimed is:

1. An ink-jet ink printing system, comprising:
   an ink-jet printer;
   at least one ink-jet ink loaded in the ink-jet printer, the ink-jet ink comprising an aqueous liquid vehicle, a pigment present at from about 1 wt % to about 5 wt %, acrylic polymer particles present at from about 1 wt % to about 5 wt %, and urethane polymer particles present at from about 0.3 wt % to about 3 wt %, said ink-jet ink formulated to print on a vinyl medium; and
   a heating device adapted to apply heat to the ink-jet ink after printing on the vinyl medium,
   wherein upon applying the heat from the heating device to the ink-jet ink after printing on the vinyl medium, the acrylic polymer particles and urethane polymer particles fuse, thereby forming a printed image with a film encapsulating at least a portion of the pigment on the vinyl medium.

2. The system of claim 1, wherein the acrylic polymer particles and the urethane polymer particles comprise a total polymer particles content, wherein the pigment to total polymer particles content weight ratio is about 1:1 to about 1:2, said polymer particles having an acrylic polymer particles to urethane polymer particles weight ratio of about 1:0.2 to about 1:1.

3. The system of claim 2, wherein the acrylic polymer particles to urethane polymer particles weight ratio is about 1.3:0.3 to about 1:0.5.

4. The system of claim 1, wherein the acrylic polymer particles comprise at least one polymerized hydrophobic monomer selected from the group consisting of: methyl acrylate, ethyl acrylate, propyl acrylate, butyl acrylate, hexyl acrylate, lauryl acrylate, octadecyl acrylate, methyl methacrylate, ethyl methacrylate, propyl methacrylate, butyl methacrylate, hexyl methacrylate, lauryl methacrylate, octadecyl methacrylate, 2-ethylhexyl acrylate, 2-ethylhexyl methacrylate, methylstyrene, vinylbenzyl chloride, acrylonitrile, methacrylonitrile, styrene, and combinations thereof.

5. The system of claim 4, wherein the acrylic polymer particles comprise a copolymer of at least two of styrene, butyl acrylate, and methacrylonitrile.

6. The system of claim 1, wherein the acrylic polymer particles comprise from 0.1 wt % to about 30 wt % polymerized acidic monomer.

7. The system of claim 6, wherein the polymerized acidic monomer is selected from the group of acrylic acid, methacrylic acid, itaconic acid, maleic acid, vinyl benzoic acid, styrenesulfonates, and combinations thereof.

8. The system of claim 1, wherein the acrylic polymer particles comprise a crosslinker in an amount of up to about 25 wt % of the acrylic polymer particles.

9. The system of claim 8, wherein the crosslinker is selected from the group consisting of: ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol triacrylate, pentaerythritol tetraacrylate, N,N'-methylenebisacrylamide, divinylbenzene, and combinations thereof.

10. The system of claim 1, wherein the heat from the heating device at which the acrylic polymer particles and urethane polymer particles fuse is from 50-100° C.

11. The system of claim 1, wherein the liquid vehicle further includes at least one organic co-solvent that evaporates more quickly than water upon application of heat from the heating device.

12. The system of claim 1, wherein the printed image has increased rubfastness compared to a comparative printed image, said comparative printed image being prepared identically to the printed image except that in the ink-jet ink used to generate the comparative printed image, the urethane polymer particles are replaced by an equal amount of acrylic polymer particles.

13. The system of claim 1, wherein the system further comprises the vinyl medium.

14. The system of claim 13, wherein upon applying the heat from the heating device, at least a portion of the aqueous liquid vehicle evaporates, the vinyl medium plasticizes, and the ink-jet ink flows.

15. A method of forming in a printed image with the system of claim 1, comprising:
   a) jetting the ink-jet ink onto the vinyl medium to form the printed image; and
   b) applying about 50° C. to 100° C. heat to the printed image to cause the acrylic polymer particles and urethane polymer particles to fuse, thereby forming a film that encapsulates at least a portion of the pigment on the vinyl medium.

16. The method of claim 15, wherein the ink-jet ink is jetted onto the vinyl medium at a temperature within 10° C. below the temperature of the heat applied to the printed image.

* * * * *